United States Patent
Vaughn et al.

(10) Patent No.: US 10,824,520 B2
(45) Date of Patent: Nov. 3, 2020

(54) RESTORING AUTOMATED ASSISTANT SESSIONS

(71) Applicant: International Business Machines Corporation, Armonk, NY (US)

(72) Inventors: Garfield Vaughn, South Windsor, CT (US); Gandhi Sivakumar, Melbourne (AU); Vasanthi M. Gopal, Plainsboro, NJ (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 16/058,047

(22) Filed: Aug. 8, 2018

(65) Prior Publication Data
US 2020/0050519 A1    Feb. 13, 2020

(51) Int. Cl.
| G06F 11/00 | (2006.01) |
| G06F 11/14 | (2006.01) |
| G06N 5/02 | (2006.01) |
| G06F 9/451 | (2018.01) |

(52) U.S. Cl.
CPC .......... G06F 11/1471 (2013.01); G06F 9/453 (2018.02); G06N 5/02 (2013.01); *G06F 2201/805* (2013.01); *G06F 2201/82* (2013.01)

(58) Field of Classification Search
CPC ............. G06F 11/0766; G06F 11/1471; G06F 11/3438; G06F 11/3476
See application file for complete search history.

(56) References Cited

U.S. PATENT DOCUMENTS

| 8,437,466 | B2 | 5/2013 | Li et al. |
| 9,635,176 | B2 | 4/2017 | Griesmer et al. |
| 9,646,466 | B2 * | 5/2017 | Dent ................. G06Q 20/1085 |
| 2003/0229467 | A1 * | 12/2003 | Lara ..................... G01R 31/319 |
| | | | 702/119 |
| 2004/0174981 | A1 | 9/2004 | Ushida |
| 2006/0126803 | A1 * | 6/2006 | Patel .................... H04M 3/5166 |
| | | | 379/88.01 |
| 2006/0126804 | A1 * | 6/2006 | Lee ...................... H04M 3/5166 |
| | | | 379/88.01 |
| 2008/0005240 | A1 | 1/2008 | Knighton et al. |
| 2014/0122618 | A1 | 5/2014 | Duan |
| 2016/0117593 | A1 | 4/2016 | London |

FOREIGN PATENT DOCUMENTS

| CN | 1735027 A | 2/2006 |
| WO | 98/55903 A1 | 12/1998 |

* cited by examiner

*Primary Examiner* — Charles Ehne
(74) *Attorney, Agent, or Firm* — Nicholas D. Bowman; Maxine L. Barasch; Keohane & D'Alessandro, PLLC (57) ABSTRACT

Disclosed embodiments provide techniques for restoring an interrupted automated assistance session. Session contexts including pertinent metadata are periodically saved for each session, including a session reentry point. When a user calls an automated response system, metadata is collected from the user and compared with metadata from saved session contexts. If the user is determined to be associated with a saved session context, the user is connected to a conversation starting at the session reentry point, thereby eliminating the need to repeat the entirety of previously provided information.

20 Claims, 10 Drawing Sheets

RESTORING AUTOMATED ASSISTANT SESSIONS

FIELD OF THE INVENTION

Embodiments relate to techniques for restoring an interrupted automated assistance session.

BACKGROUND

Artificial intelligence (AI) based systems are available to provide virtual assistants (VAs, or chatbots) simulating humans at the other end of a conversation. Chatbots are deployed in the field for assisting end users by providing information or helping with tasks such as installation or troubleshooting. Chatbots can be designed for specific business purposes and can accept incoming calls from users. Unfortunately, with any technology, unplanned outages and interruptions can occur at any time. This is disruptive for the user and may require the user to call back to reestablish a connection to obtain the information they were looking for. It is time consuming and inefficient to begin the call again, as well as repeat information to the chatbot that was provided prior to the interruption. There exists a need for improvements in automated assistant technologies.

SUMMARY

In one embodiment, there is provided a computer-implemented method for restoring an interrupted automated assistance session, comprising: saving a session context for the interrupted automated assistance session; determining that a user is associated with the saved session context; identifying a session reentry point for the interrupted automated assistance session; and resuming the interrupted automated assistance session from the session reentry point.

In another embodiment, there is provided an electronic communication device comprising: a processor; a memory coupled to the processor, the memory containing instructions, that when executed by the processor, perform the steps of: saving a session context for an interrupted automated assistance session; determining that a user is associated with the saved session context; identifying a session reentry point for the interrupted automated assistance session; and resuming the interrupted automated assistance session from the session reentry point.

In yet another embodiment, there is provided a computer program product for an electronic communication device comprising a computer readable storage medium having program instructions embodied therewith, the program instructions executable by a processor to cause the electronic communication device to perform the steps of: saving a session context for an interrupted automated assistance session; determining that a user is associated with the saved session context identifying a session reentry point for the interrupted automated assistance session; and resuming the interrupted automated assistance session from the session reentry point.

BRIEF DESCRIPTION OF THE DRAWINGS

Features of the disclosed embodiments will be more readily understood from the following detailed description of the various aspects of the invention taken in conjunction with the accompanying drawings.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Disclosed embodiments provide techniques for restoring an interrupted automated assistance session. Session contexts including pertinent metadata are periodically saved for each session, including a session reentry point. When a user calls an automated response system, metadata is collected from the user and compared with metadata from saved session contexts. If the user is determined to be associated with a saved session context, the user is connected to a conversation with the automated assistant, starting at the session reentry point, thereby eliminating the need to repeat the entirety of previously provided information. In addition to being aware of the prior session, another improvement is the ability of the chatbot to identify the context and be able to remind the user of what was previously discussed.

In embodiments, each time a user interacts with the chatbot, the system checks to see if there was a prior session for the user. If no prior session exists, then the system treats the conversation as a new interaction. If it does identify a previous session, it retrieves details of the session and then checks with the user providing contextual detail for the user to confirm. If the user confirms they would like to continue with the conversation, then all new conversation snippet content created is stored as a continuation of the previously interrupted session (chat). In this way, customer response time is reduced, and overall efficiency of an automated response system is improved.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

Figure 1:
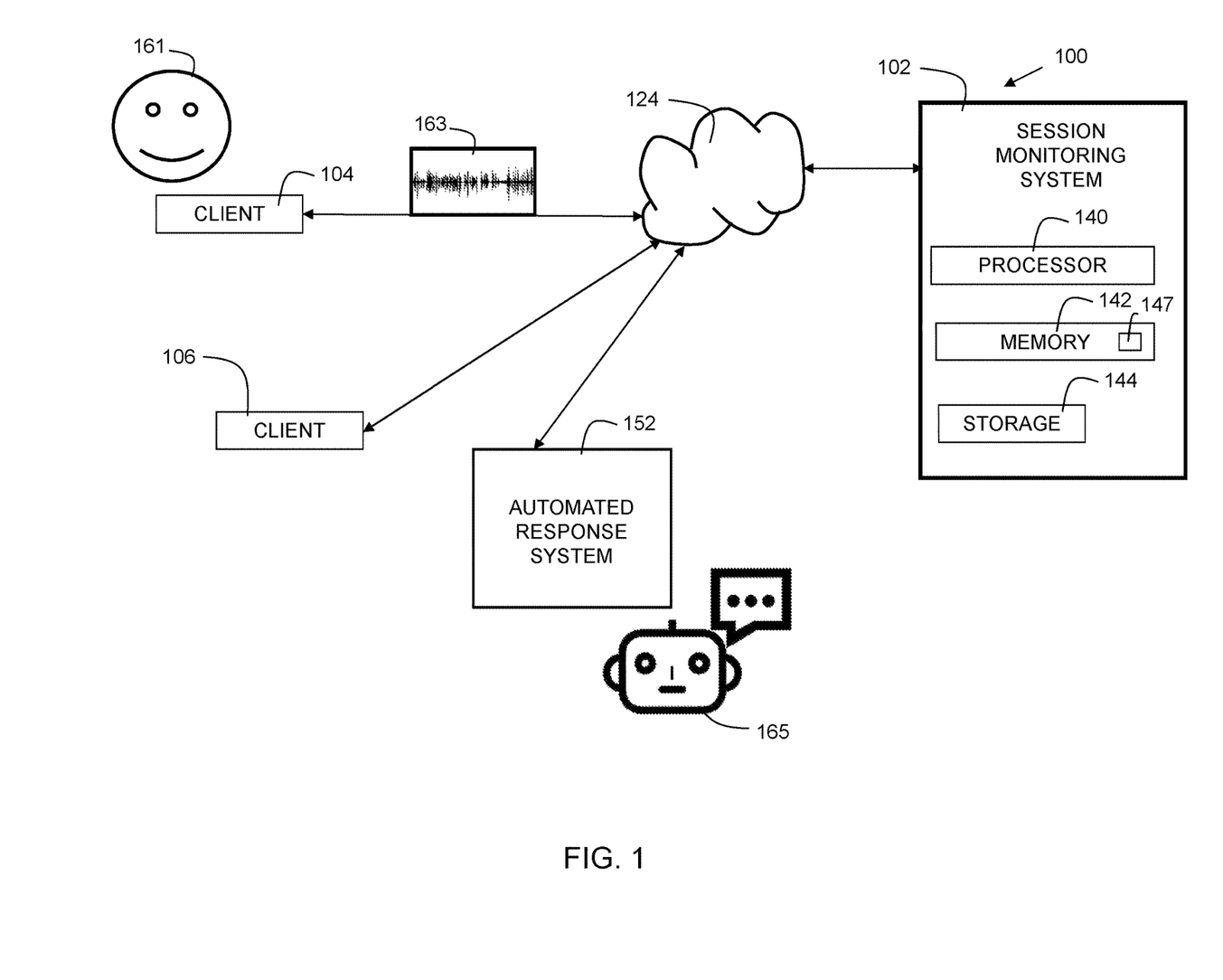
FIG. 1 is a diagram for an environment of embodiments of the present invention.

FIG. 1 is a diagram 100 for an environment of embodiments of the present invention. A session monitoring system 102 may include a processor 140, memory 142, and storage 144. The processor 140 is coupled to the memory 142 such that it can access instructions 147 stored in memory 142. The processor 140 executes the instructions 147, stored in memory 142, in implementation of embodiments of the present invention. Memory 142 may include dynamic random-access memory (DRAM), static random-access memory (SRAM), magnetic storage, and/or a read only memory such as flash, EEPROM, optical storage, or other suitable memory. In some embodiments, the memory 142 may not be a transitory signal per se. The storage 144 may include one or more hard disks, or other suitable storage technology. System 102 is an electronic computing device. Note that while one such device is illustrated in diagram 100, in practice, there may be multiple electronic computing devices 102 operating in a distributed manner for load balancing and data redundancy.

The session monitoring system 102 is connected to network 124. Network 124 is the Internet, a wide area network, a local area network, or any other suitable network. Client devices 104 and 106 are also connected to network 124. Client devices belong to a person (e.g., client 104 belongs to live user 161). Each of the client devices is a smartphone, smartwatch, tablet computer, laptop computer, or any other suitable mobile and/or wearable device now known or hereafter developed. The client devices have Bluetooth®, Wi-Fi, or other suitable communication interface to communicate over network 124. The client devices have a GPS or another geolocation receiver for determining the user's location.

The client devices include, or are connected to, a microphone for capturing user speech. Waveform 163 represents audio/speech utterances captured from live user 161 into a microphone of the client 104 and then communicated through network 124 to automated response system 152 for processing and/or storage. User voice data can include voice samples (e.g., stored in PCM or other suitable format), and/or voice metadata, such as average frequency range.

Automated response system 152 is also connected to network 124. System 152 is a computing device, which implements a chatbot (referred to herein interchangeably as a "virtual assistant"), represented here at 165. The chatbot is an entity created by system 152. It is what the user is "talking to" when interacting with system 152. The chatbot simulates a human at the other end of a conversation. When a user calls an automated response system, metadata is collected from the user and compared with metadata from saved session contexts. If it is determined that the user is associated with a saved session context, the user is connected to a conversation starting at the session reentry point (which corresponds to, or is the same as, the termination point where the previous conversation was interrupted), thereby eliminating the need to repeat the entirety of previously provided information.

The automated response system 152 is driven by artificial intelligence (AI), heuristics, natural language processing, and/or machine learning. A user may be able to speak to the chatbot, and the speech is converted to text. The text is then analyzed for content, such that the chatbot can respond to the live user.

A "session" herein is the act of a user communicating with the automated response system. A "session context" is a data structure containing one or more pieces of metadata and/or conversation data pertaining to a session between a user and an automated voice response system. Sometimes, the session may be interrupted, for example, if the user's network connection with the client device experiences an error. Unfortunately, with any technology, unplanned outages and interruptions can occur at any time. The user may call back to attempt to get the information they still need, or have their question answered, etc. Session monitoring system 102 determines if calling users were previously engaged in a session that got interrupted. If it is determined that the user was previously disconnected, it attempts to restore the user to where they were previously in the automated conversation flow. In this way, the conversation can be resumed without duplicating previous effort in the previous conversation.

Accordingly, in embodiments, each time a user initially interacts with the chatbot, the system 102 checks to see if there was a prior session (stored as a session context) for the user. If no prior session exists (no session context is found), then the system treats the conversation as a new interaction. If it does identify a previous session, it retrieves details of the session from the data of the session context and then checks with the user providing contextual detail for the user to confirm. If the user confirms they would like to continue with the conversation, then all new content created will be stored as a continuation of the previously interrupted session in a session context. In this way, customer response time is reduced, and overall efficiency of an automated response system is improved.

Figure 2:
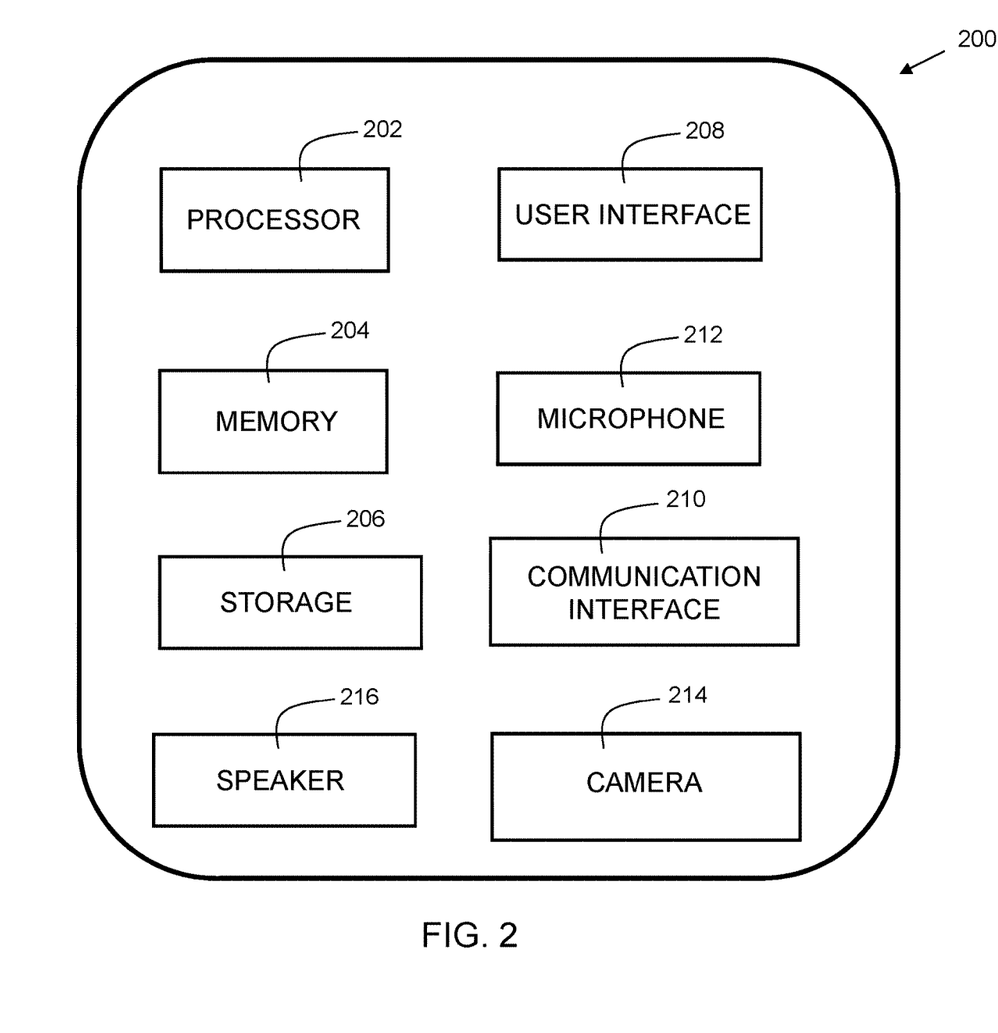
FIG. 2 shows a block diagram of an electronic communication device used with embodiments of the present invention.

FIG. 2 shows a block diagram of an electronic communication device used with embodiments of the present invention. Device 200 is a smartphone, tablet computer, or other computing device. Device 200 includes a processor 202, which is coupled to a memory 204. Memory 204 may include dynamic random-access memory (DRAM), static random-access memory (SRAM), magnetic storage, and/or a read only memory such as flash, EEPROM, optical storage, or other suitable memory. In some embodiments, the memory 204 may not be a transitory signal per se.

Device 200 may further include storage 206. In embodiments, storage 206 may include one or more magnetic storage devices such as hard disk drives (HDDs). Storage 206 may additionally include one or more solid state drives (SSDs).

Device 200 further includes user interface 208. This may be a display, such as an LED display, a touch-sensitive screen, a keyboard, a mouse, or any other suitable interface for a user to interact with device 200.

The device 200 further includes a communication interface 210. The communication interface 210 may be a wired communication interface that includes Ethernet, Gigabit Ethernet, or the like. In embodiments, the communication interface 210 may include a wireless communication interface that includes modulators, demodulators, and antennas for a variety of wireless protocols including, but not limited to, Bluetooth™, Wi-Fi, and/or cellular communication protocols for communication over a computer network.

Device 200 further includes a microphone 212 for capturing user utterances and speech. The microphone may be integral with the device 200 as shown, or connected thereto via a wired or wireless connection.

Device 200 may further include camera 214. The camera may be integral with the device 200 as shown, or connected thereto via a wired or wireless connection.

Device 200 further includes a speaker 216, which may be powered or passive.

Figure 3:
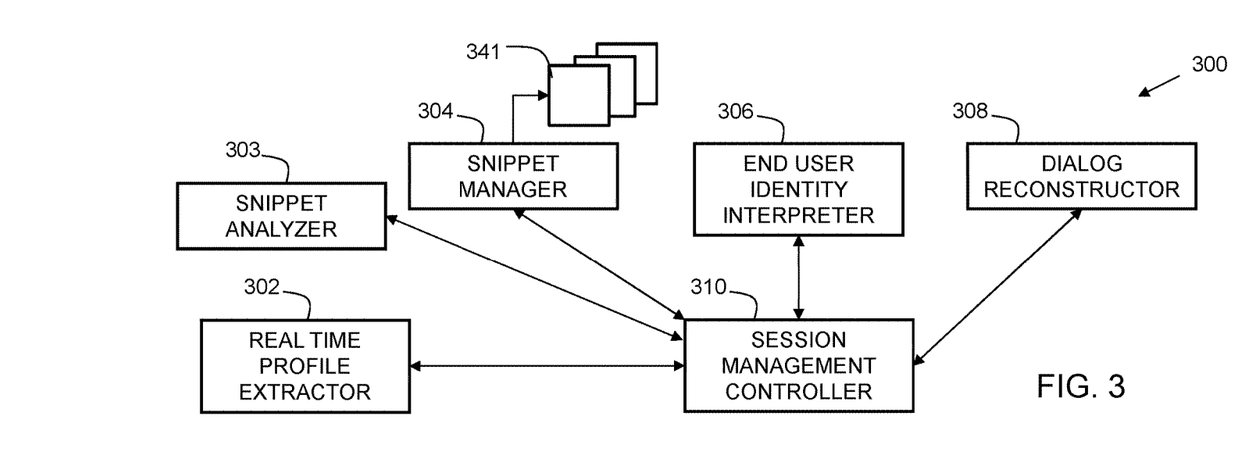
FIG. 3 is a block diagram of components for a session monitoring system in accordance with embodiments of the present invention.

FIG. 3 is a block diagram 300 of components for the session monitoring system. Real time profile extractor 302 tracks dialog, script flow, and sequence within the script. In embodiments, the real-time profile extractor monitors the current point within a script. In embodiments, an automated response system may utilize a script containing multiple questions for a user. Based on user response, other questions may be asked. Some questions may be skipped, based on user responses. Each part of the script may be designated by a session point, which represents a question and/or response within the script. In addition to monitoring the session point, the real-time profile extractor may record various metadata regarding the user. The metadata can include, but is not limited to, the user location, user IP address, user telephone number, user average voice frequency, and/or other information known about the user. The metadata, along with the session point, can then be used to identify potential users that are attempting to reestablish a previously disconnected session. Thus, the chatbot may have a preprogrammed script it may follow when initiating a conversation (session). It may have preprogrammed questions or responses to provide in reply to particular questions or information from the user.

Snippet analyzer 303 performs a speech-to-text process on uttered phrases in the conversations. In embodiments, uttered phrases (stored as "snippets") are received from a client device (e.g., 104 or 106 via a computer network 124 at the system 102 (FIG. 1)). The uttered phrases may be captured by a microphone (e.g., microphone 212 (FIG. 2)). The uttered phrases may be received by the snippet analyzer 303 in the form of a sound representation such as PCM (Pulse Code Modulated) data, a WAV file, MP3 file, compressed audio data, or other suitable audio format. A speech-to-text process is performed by analyzer 303 on the uttered phrase.

As part of the speech-to-text process, the system may perform a phoneme extraction process to extract the phonemes from the audio data. In the English language, there are 44 phonemes. Other languages may have more or fewer phonemes. For example, Spanish has 24 phonemes, while German has 45 phonemes. A variety of tools, such as CMU Sphinx, are available for performing phoneme extraction. While the examples disclosed herein use English, embodiments may be adapted to operate with a variety of languages, including, but not limited to, Spanish, French, Italian, German, Portuguese, Japanese, or Chinese.

The speech-to-text process may further include performing a homonym disambiguation process. For example, some words are pronounced the same way, such as eight and ate. The homonym disambiguation process may use tokenization and part-of-speech identification to determine the most likely word that matches the phonemes. For example, if a third-person subject pronoun ("he" or "she") precedes a phoneme that sounds like "eight," then the intended word is most likely to be "ate."

The speech-to-text process may consider dialects within a language. For example, in English, there are a variety of dialects (e.g., British, American, Canadian, and Australian English) which may each have a slightly different lexicon. The speech-to-text process may use the dialect in computing the probability of a phoneme or set of phonemes matching a particular word.

Note that in some embodiments, rather than receiving audio data, instant or text message data may be received and analyzed instead. Therefore, the speech-to-text process would not be necessary or included in those scenarios.

Snippet manager 304 stores and indexes multiple session snippets 341.

"Snippets" are pieces/portions of conversation that are stored (as text format after transcription) and indexed for use as clues for reconnecting when a user calls back following a disconnection. A scenario summary is generated for one or more of the received uttered phrases (snippets). An entity detection process is performed on the transcribed snippet to generate the scenario summary. The entity detection may include extraction, which is the detection and preparation of named entity occurrences. The extraction phase includes POS (part of speech) tagging, tokenization, and/or sentence boundary detection. The entity detection may further include noun identification, followed by identifying a subset of nouns including proper nouns, and nouns deemed to be topically pertinent. Long word analysis, bigram analysis, disambiguation are further examples of text analysis and identification of entities for use as keywords. The extracted entities may be used as keywords within the scenario summary. These keywords can then be used as categories under which the session is to be indexed.

In practice, the index is queried using the scenario summary as an input to the query. This is performed to retrieve the appropriate session if existing. The user can then be reconnected if the session is located.

End user identity interpreter 306 attempts to determine the identity of the user based on metadata. Examples of metadata include IP address, telephone number, location, and/or other information that can be discerned from a connection. Note that the amount of information available may be incomplete, so the interpreter 306 may need to implement deductive techniques based on whatever information it does have.

Dialog reconstructor 308 reestablishes the session at the reentry point where it was terminated, thus restoring the session. It reconnects the live user to the point in the text flow where the conversation left off. The chatbot continues the script forward from the reentry point (which corresponds to the termination point where the session was previously disrupted).

Session management controller 310 orchestrates the operation and interfaces with the automated response system (e.g., with RESTful APIs or other suitable mechanism).

Controller 310 manages and connects the components such that the session monitoring system operates cohesively and effectively.

Figure 4:
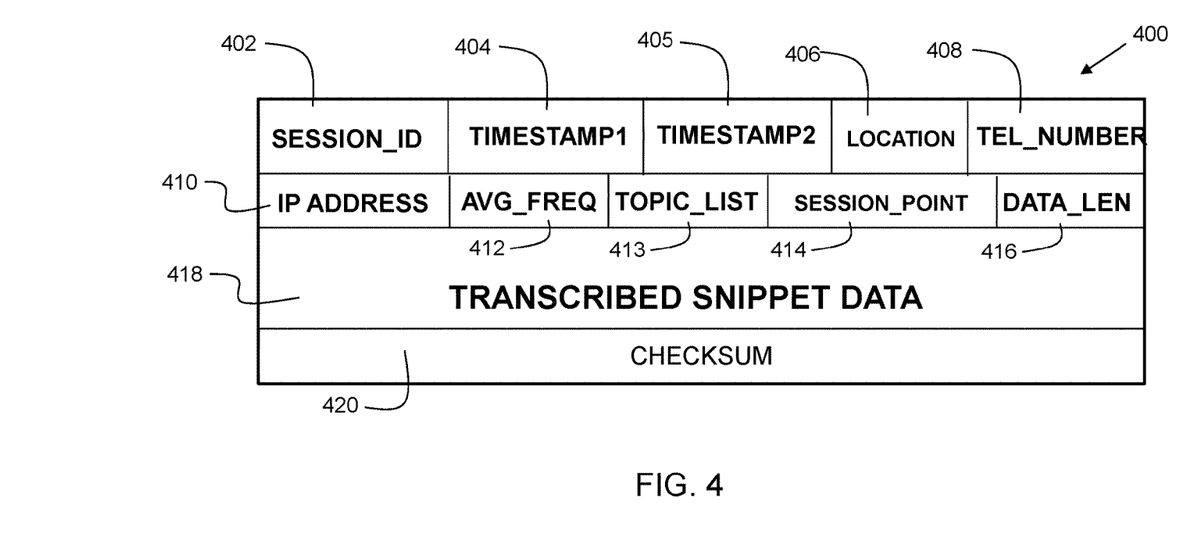
FIG. 4 is an example data structure for a session context.

FIG. 4 is an example data structure 400 for a session context. This data structure may include fields for storing metadata relating to the session (conversation), such as length or caller characteristics (such as voice frequency, location, etc.).

At 402, there is a field for a session identifier. This may be an alphanumeric symbolic set of characters or other suitable identifier. This is for indexing, storing, and retrieving a session or information relating to the session.

At 404, there is a field for a first timestamp, which may be the date and time at which the call connected (i.e., the time the session started). At 405, there is a field for a second timestamp, which may be the date and time at which the call disconnected (i.e., the termination point).

The sooner the return call comes in following a disconnection, the more likely it is a repeat caller is looking to finish a conversation that was disconnected. For example, if the current caller is calling only 15 minutes after the time corresponding to the disconnection timestamp, it is probable that it is a repeat caller. If, however, the caller is calling five hours after the time corresponding to the disconnection timestamp, then it is less probable.

Some embodiments can include deleting the saved session context after a predetermined duration from the time corresponding to a timestamp (either the first timestamp (the connection point) or the second timestamp (the termination point)). Accordingly, in some embodiments, the session contexts may automatically get deleted after a period of time (e.g., three hours) from a timestamp of the initiation (connection) of the call, or a timestamp noting the termination of the call (at interruption).

At 406, there is a field for caller location. This is the detected location of the caller. It may vary in granularity. For example, in some embodiments, the location may be precise, such as latitude and longitude coordinates, or more generic, such as "Chicago." It may be determined from a GPS system, or other tracking software, on the user's mobile device or computing device from which the call is connected.

The user may call from a cellular phone or using a computing device through, for example, voice-over-IP, or the like. At 408, there is a field for a telephone number from which the call is detected to have initiated. At 410, there is a field for an IP address from which a voice over IP call is detected to have initiated.

At 412, there is a field for average frequency detected of the user's voice. The voiced speech of a typical adult male has a fundamental frequency from 85 Hz to 180 Hz, and that of a typical adult female from 165 Hz to 255 Hz. Thus, by measuring and recording the average frequency of the speaker during a session, it can be used to compare with speech from a live caller to see if it matches or is similar. Thus, if the previous caller's voice had an average frequency of 205 Hz and a current caller's voice has an average frequency of 140 Hz, it is probable that the previous caller and the current caller are not the same person.

At 413, there is a field for a topic list. This may be a set of data including keywords detected from the user's speech. In embodiments, a computer-implemented entity detection process is performed to generate a topic list, which includes one or more keywords indicating the topic the user was previously discussing. The entity detection can include extraction, which is the detection and preparation of named entity occurrences. The extracted entities can be used as keywords within the topic list.

The data structure 400 may include several other fields. At 414, there is a field for a session point. This is an indicator of where within the script the session was disconnected. This may be stored as an alphanumeric identifier, or other suitable identifier. At 416, there is a field for data length, meaning the length of the transcribed snippet data. At 418, there is a field for transcribed snippet data. This stores the text transcribed from the audio (user speech). It can be used for analysis to develop the topic list or other metadata. At 420, there is a field for a checksum. The checksum field can be used to verify the integrity of the received snippet data. Note that some fields may be empty (NULL), such as a telephone number may be unavailable, or the user may be using, for example, Skype® without any telephone number at all.

Figure 5:
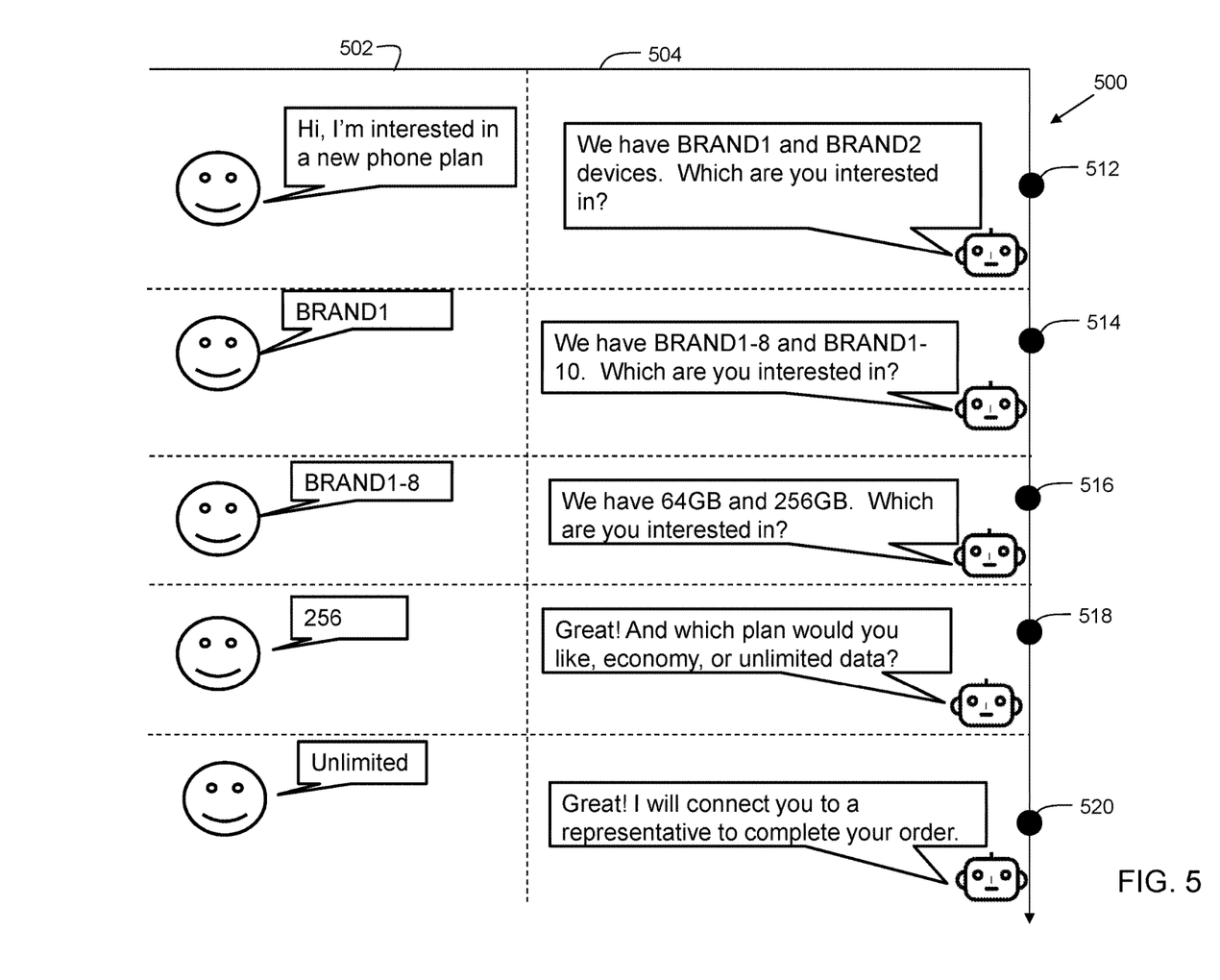
FIG. 5 is an exemplary automated assistance session flow.

FIG. 5 is an exemplary automated assistance session flow 500. This represents an ideal uninterrupted conversation flow between a live user (human) in column 502 and a chatbot in column 504. The chatbot is an automated response entity for interaction with a live user. In the example, at row 512, the user says, "Hi, I'm interested in a new phone plan," and the chatbot responds with "We have BRAND1 and BRAND2 devices. Which are you interested in?" In row 514, the user then says, "BRAND1," and the chatbot responds with "We have BRAND1-8 and BRAND1-10. Which are you interested in?" In row 516, the user says, "BRAND1-8", and the chatbot responds with "We have 64 GB and 256 GB. Which are you interested in?" At row 518, the user then says "256," and the chatbot responds with "Great! And which plan would you like—economy, or unlimited data?" At row 520, the user then says, "Unlimited," and the chatbot responds with "Great! I will connect you to a representative to complete your order."

Figure 6:
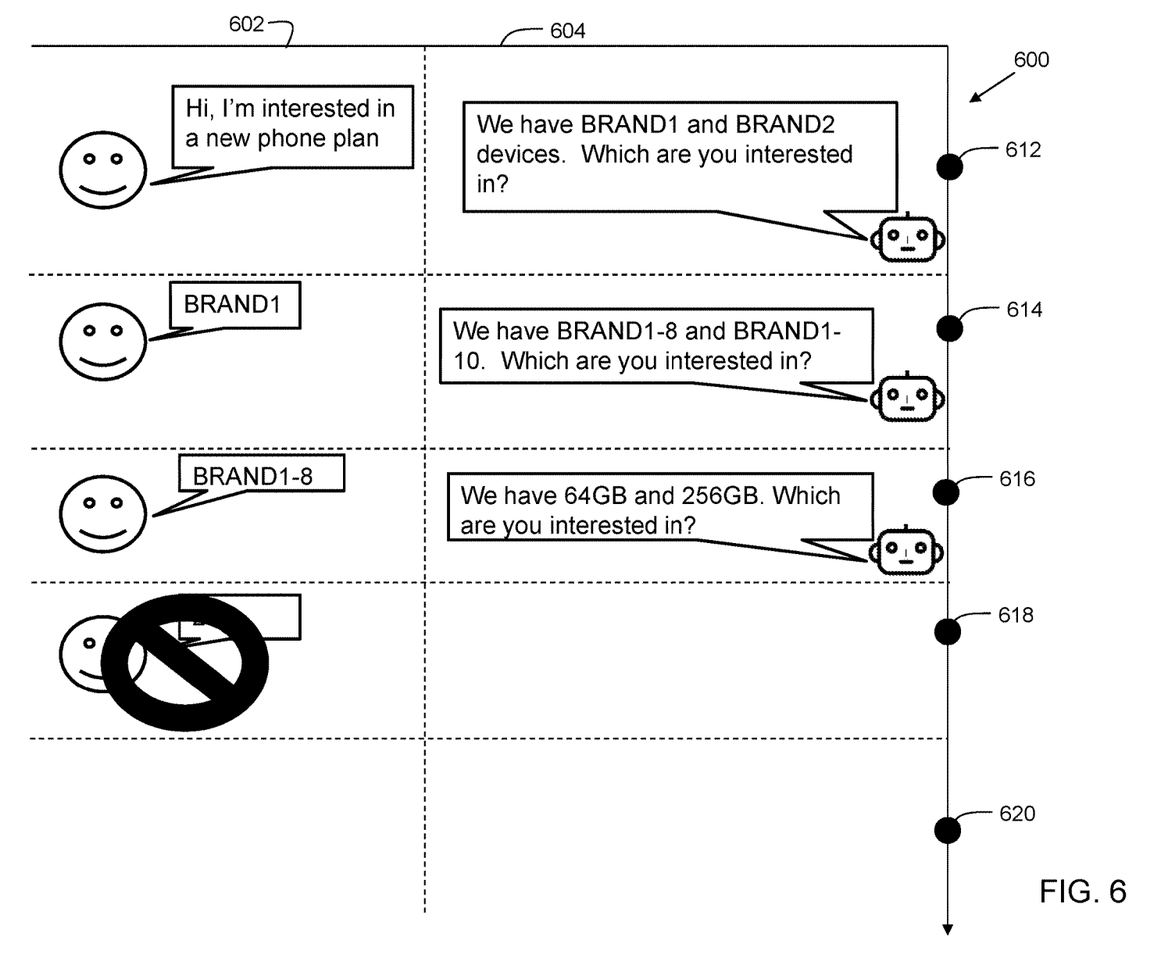
FIG. 6 shows an example of an interrupted automated assistance session flow.

FIG. 6 shows an example of an interrupted automated assistance session flow 600. This represents an interrupted conversation flow between a live user (human) in column 602 and a chatbot in column 604. The chatbot is an automated response entity for interaction with a live user. In the example, at row 612, the user says, "Hi, I'm interested in a new phone plan," and the chatbot responds with "We have BRAND1 and BRAND2 devices. Which are you interested in?" At row 614, the user then says, "BRAND1," and the chatbot responds with "We have BRAND1-8 and BRAND1-10. Which are you interested in?" At row 616, the user then says, "BRAND1-8", and the chatbot responds with "We have 64 GB and 256 GB. Which are you interested in?" The call or IP connection then gets disconnected, and the session is interrupted. Here, the user got disconnected partway through the conversation, so there are no entries in rows 618 and 620 since the session was terminated at row 618 of column 602. The chatbot never obtained the user's response to the last question asked in row 616 of column 604.

Figure 7:
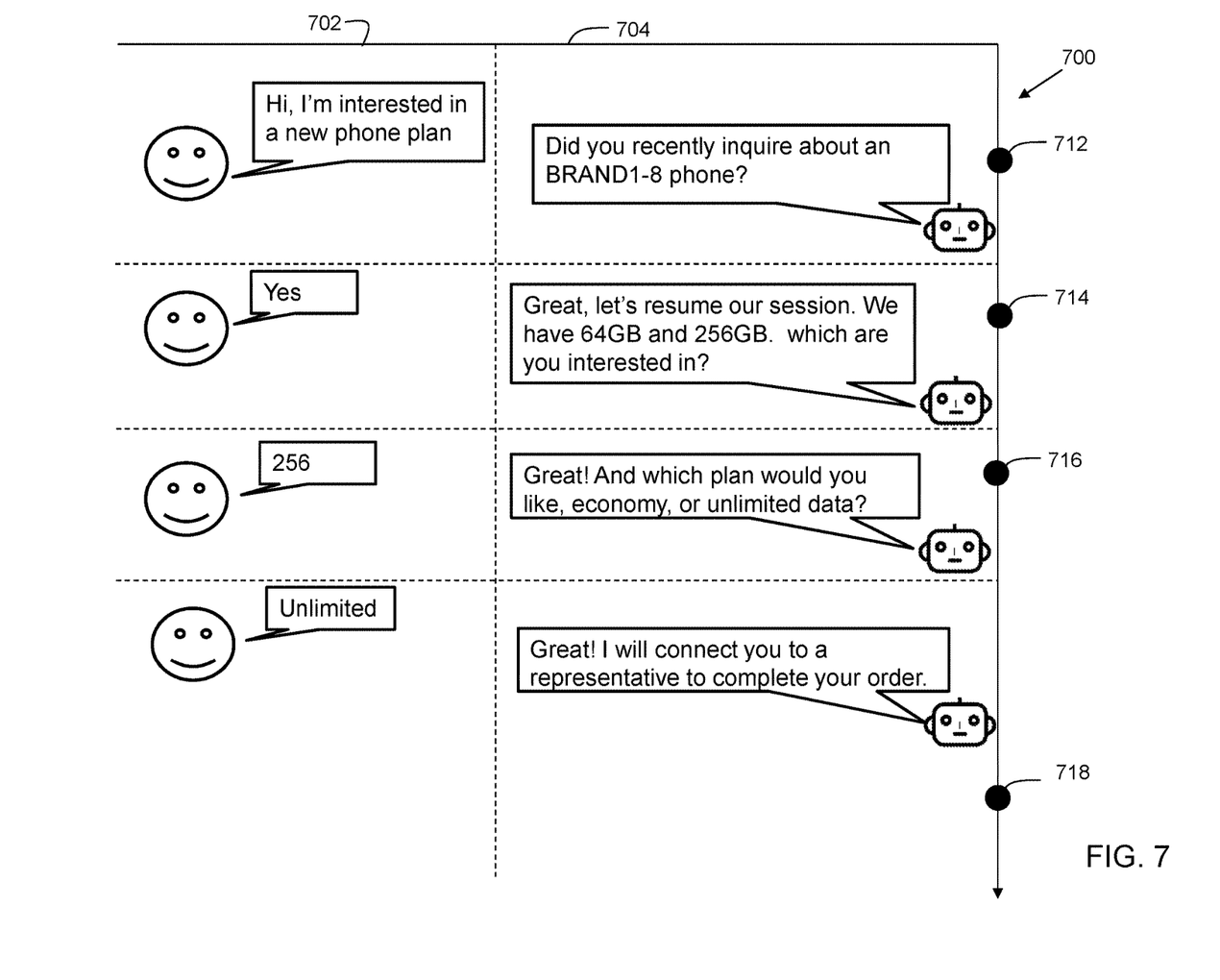
FIG. 7 shows an example of a restored automated assistance session.

FIG. 7 shows an example of a restored, automated assistance session flow 700. This represents a resumed conversation flow between a live user (human) in column 702 and a chatbot in column 704. The chatbot is an automated response entity for interaction with a live user. At row 712, the user says, "Hi, I'm interested in a new phone plan," and the chatbot then responds with, "Did you recently inquire about a BRAND1-8 phone?" Here, when the user calls back, the system recognizes that the user possibly was previously calling and got disconnected (as evidenced by a session context having parameters indicative of that probability), so it presents a topic verification question (row 712 of column 704). At row 714, the user then says, "Yes," which is an affirmative response. Accordingly, the session is resumed from the reentry point (row 616 of column 604 of FIG. 6). The chatbot then responds at column 704 row 714 with "Great, let's resume our session. We have 64 GB and 256 GB. Which are you interested in?" At row 716, the user says, "256," and the chatbot then responds with "Great! And which plan would you like, economy, or unlimited data?" At column 702 row 718, the user says, "Unlimited," and the chatbot then responds with "Great! I will connect you to a representative to complete your order."

Figure 8:
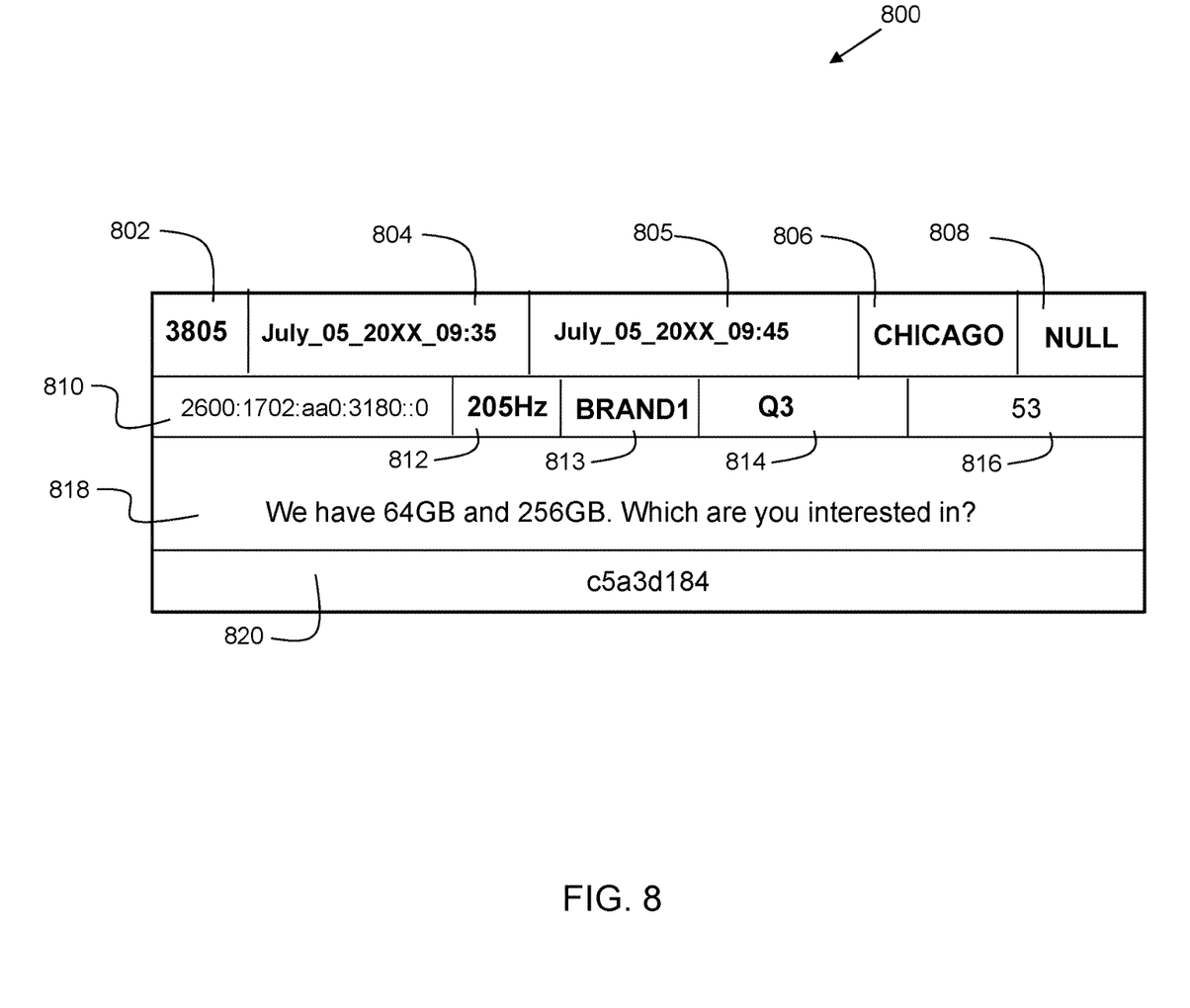
FIG. 8 is an example data structure with exemplary values in data fields.

FIG. 8 is an example data structure 800 with exemplary values in data fields for an example session context. At 802, in the field for a session identifier, there is "3805". This is the identifier assigned to the session.

At 804, in the field for the first timestamp, there is "July_05_20XX_09:35". This is the date and time at which the call connected (i.e., the time the session started). It may be compared with a time at which a live user calls to help determine whether the live user is a repeat caller.

At 805, in the field for the second timestamp, there is "July_05_20XX_09:45". This is the date and time at which the call terminated (i.e., the time the session ended). It may be compared with a time at which a live user calls to help determine whether the live user is a repeat caller from a recent session that ended unexpectedly/abruptly due to a session disconnect.

At 806, in the field for location, there is "Chicago." This is the detected location of the caller during the session. It may have been determined from a GPS system on the user's mobile device or computing device from which the call is connected. In some embodiments, the location may be ascertained from the telephone area code and/or source IP address.

At 808, in the field for a telephone number, there is no data, since the user is calling using a web-based platform such as Skype®. Accordingly, at 810, in the field for an IP address, there is "2600:1702:aa0:3180::0".

At 812, in the field for average frequency detected of the user's voice, there is "205 Hz". This falls into the range of a typical adult female. Accordingly, if by voice frequency, a later caller is determined to be male, it is unlikely that the later caller is the female caller calling back.

At 813, in the field for a topic list, there is "BRAND1". This is an entity (i.e., keyword), detected from the user's speech during the call.

At 814, in the field for session point, there is "Q3." This is an indicator of where within the script the session was disconnected. In the example, the Q3 represents the session being disconnected after question 3 of the script.

At 816, there is a field for data length, which, in this example, is indicated as 53 bytes. In embodiments, the data length may include the number of bytes contained within the transcribed snippet data field.

At 818, in the field for transcribed snippet data, there is "We have 64 GB and 256 GB. Which are you interested in?" This is a snippet from the conversation flow at column 604, row 616 (FIG. 6).

At 820, there is a field for checksum. In the example here, it is the base-16 value c5a3d184, and can be used to confirm the integrity of the data.

Figure 9:
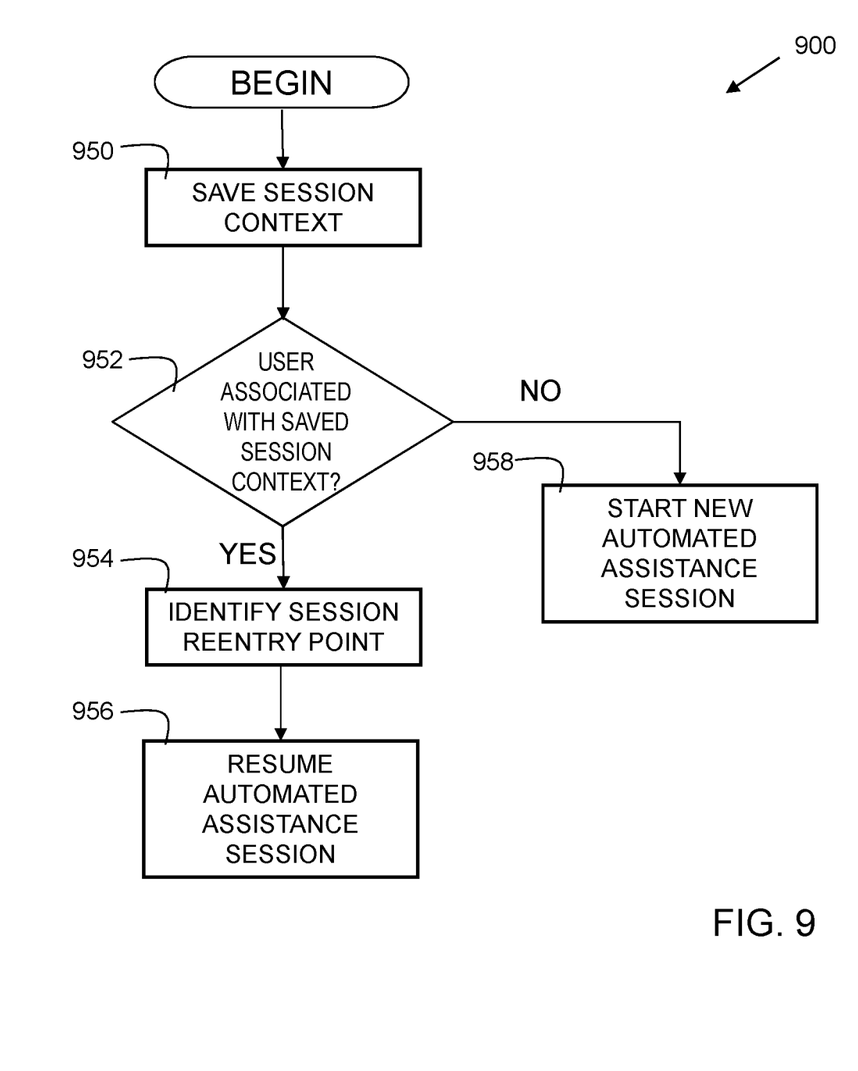
FIG. 9 is a flowchart indicating process steps for embodiments of the present invention.

FIG. 9 is a flowchart 900 indicating process steps for embodiments of the present invention. At 950, a session context is saved. At 952, it is determined whether the user (i.e., caller) is associated with a saved session context. In some embodiments, determining that the user is associated with the saved session context includes comparing a user telephone number with a saved telephone number stored in the saved session context. In some embodiments, determining that the user is associated with the saved session context includes comparing a user IP address with a saved IP address stored in the saved session context.

If, at 952, it is determined that the user is associated with the session context, at 954, a session reentry point is identified, and at 956, an automated assistance session is resumed. If, at 952, it is determined that the user is not associated with the saved session context, then at 958, a new automated assistance session is started.

Figure 10:
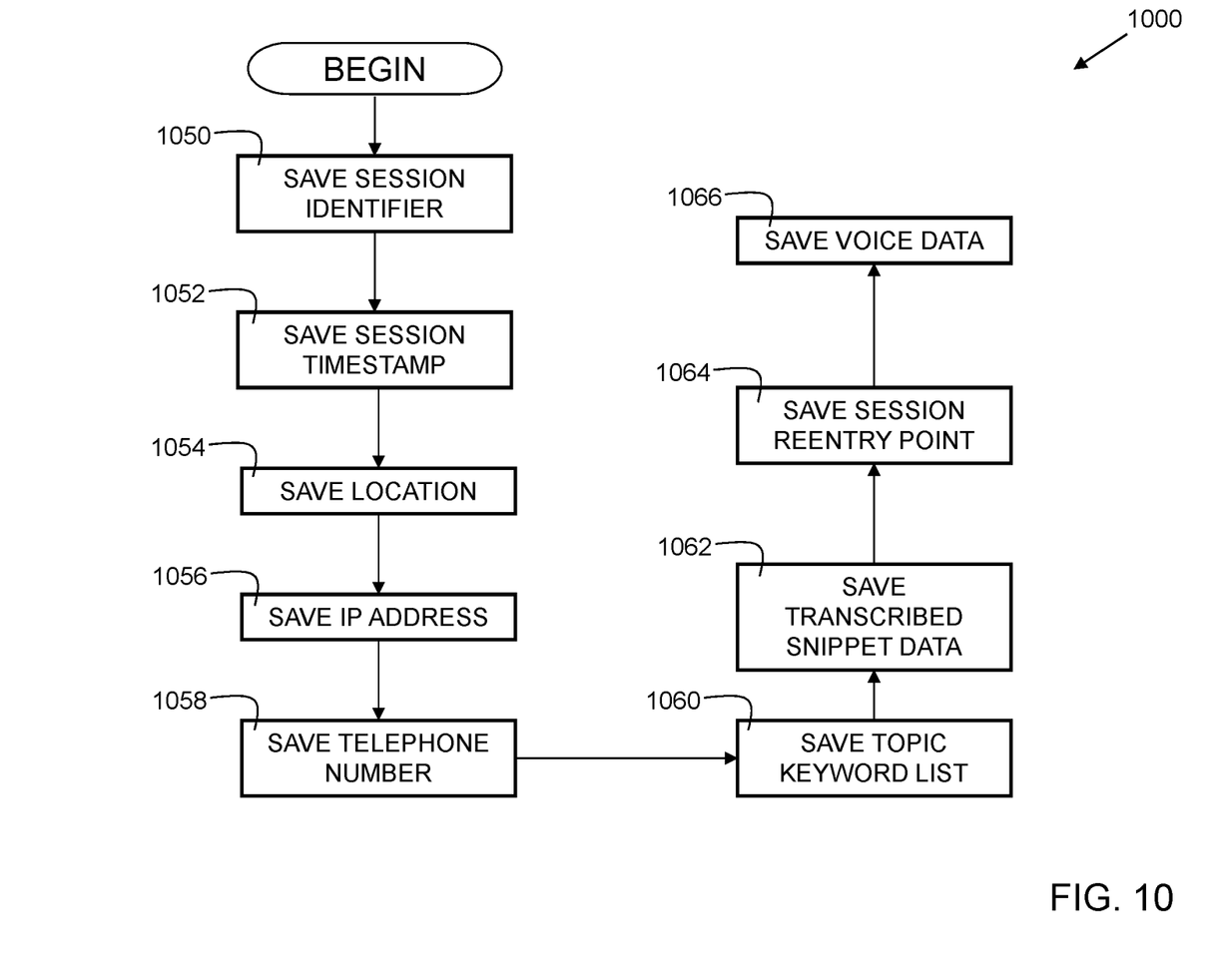
FIG. 10 is a flowchart indicating process steps for session context saving in accordance with embodiments of the present invention.

FIG. 10 is a flowchart 1000 indicating process steps for session context saving in accordance with embodiments of the present invention. At 1050, a session identifier is saved. At 1052, a session timestamp (one or more) is saved. At 1054, a location is saved. In embodiments, saving a session context includes saving a user location associated with the interrupted automated assistance session. The location may be determined from a telephone number (such as the area code), an IP address range, and/or provided by user device (e.g., via GPS). At 1056, an IP address is saved. In embodiments, saving a session context includes saving a source IP address associated with the interrupted automated assistance session. At 1058, a telephone number is saved. In embodiments, saving a session context includes saving a user telephone number associated with the interrupted automated assistance session. At 1060, a topic keyword list is saved. In embodiments, saving a session context includes saving a topic associated with the interrupted automated assistance session. At 1062, transcribed snippet data is saved. At 1064, a session reentry point is saved. At 1066, voice data is saved. In embodiments, saving a session context includes saving user voice data associated with the interrupted automated assistance session. In some embodiments, this includes average frequency, speech pattern, common word usage, etc. In some embodiments, not all data is available so more or fewer steps may be included where feasible.

Figure 11:
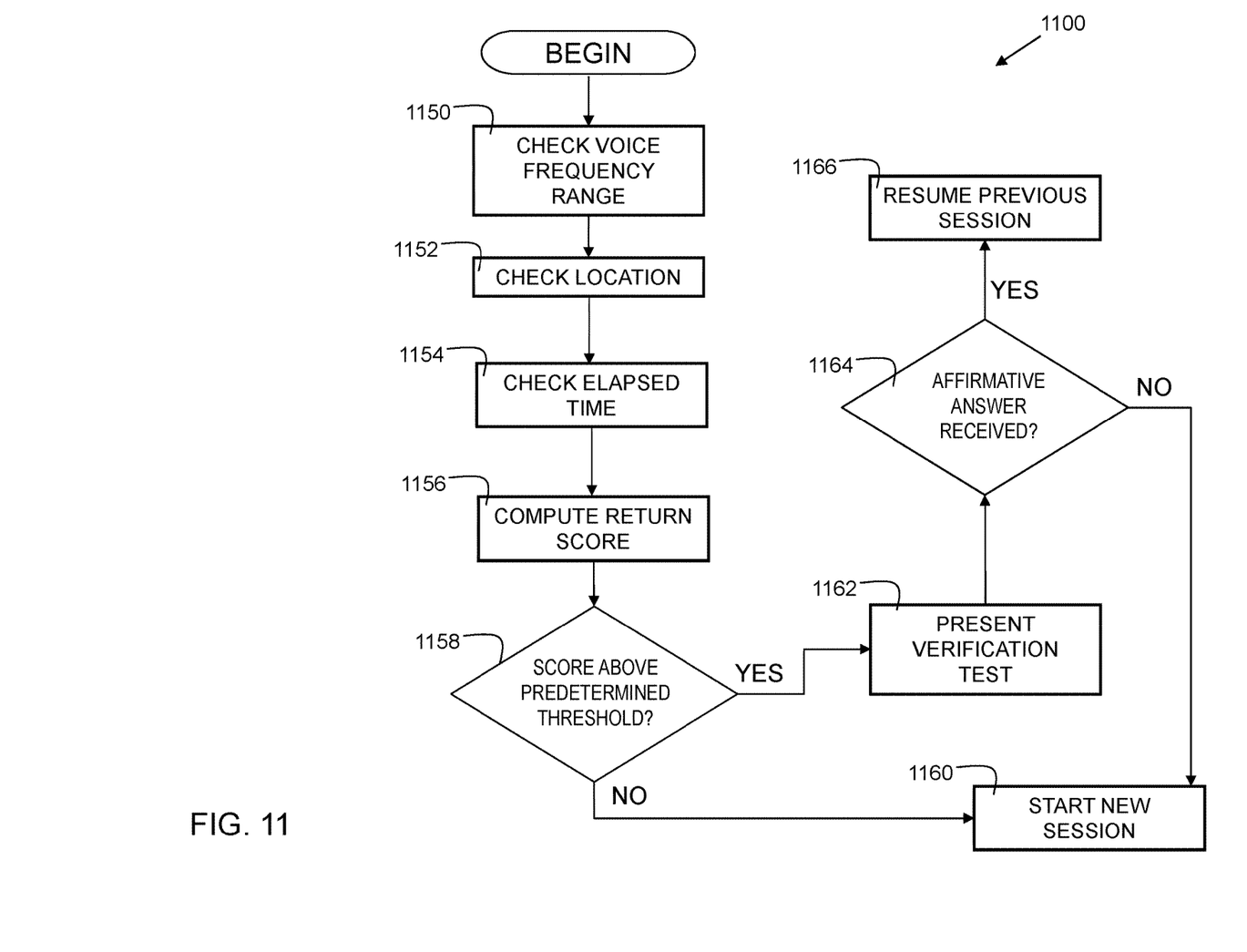
FIG. 11 is a flowchart indicating process steps for session restoring in accordance with embodiments of the present invention.

FIG. 11 is a flowchart 1100 indicating process steps for session restoring in accordance with embodiments of the present invention.

At 1150, voice frequency range is determined. It can be checked against a threshold or various thresholds to determine if a probable gender can be assigned.

At 1152, user location is determined. Note that the current live caller's location does not have to be an exact match to the stored location (recorded during the session) since, for example, the user may have been talking on a cell phone while driving a car. Accordingly, if the location associated with the session context, and the location of the current live caller, are within a predetermined distance of one another, this may indicate a likelihood that the return caller is the same caller as that of the terminated session. For example, if the location of the live caller is within a 60-mile radius after one hour has elapsed between the termination of the session and the return call, this may indicate a more probable match since the person may have been driving at 60 miles per hour (a typical speed limit) and after an hour, would then be 60 miles away.

At 1154, an elapsed time between the disconnection and the call back is checked. The shorter this period of time, the more likely the current live caller is calling back from the previously disconnected call.

At 1156, a return score is computed. Identifying a returning user with a return score above a predetermined threshold can include an empirical formula, using weights and/or other computations and/or formulas to obtain a score indicative of a likelihood that the current user is a returning user. In an example, the return score R can be calculated as follows:

$$R = K_1 f(V) + K_2 f(L) + K_3 f(T)$$

Where $K_1$, $K_2$, and $K_3$ are constants, f(V) is a function based on an average voice frequency, f(L) is a function based on location, and f(T) is a function of the time elapsed since disconnection of a session. In embodiments, L may be specified as a numeric identifier such as a latitude longitude pair, a zip code, state code, or other alphanumeric identifier. In some embodiments, f(V) may be a Boolean function, evaluating to one if the location matches, and zero if the location does not match. As an example, if the location of the session caller is indicated as "NJ" (state code for New Jersey) and the location of the caller from the previous session that is saved by the snippet manager is indicated as "NJ", then the function f(L) evaluates to one. If, instead, the location of the session caller is indicated as "PA" (state code for Pennsylvania) and the location of the caller from the previous session that is saved by the snippet manager is indicated as "NY" (state code for New York), then the function f(L) evaluates to zero.

In embodiments, the time function f(T) varies inversely with the time value T. Thus, the longer the time between the previous session termination and the user callback, the lower the return score R. Conversely, if a user calls back quickly after disconnection, the aforementioned algorithm creates a higher return score, indicating a higher likelihood that the caller is attempting to reestablish (restore) the previous session.

At 1158, it is determined whether the return score is above a predetermined threshold. If at 1158 it is determined that the score is not above the threshold, then at 1160 a new session is started.

If at 1158 it is determined that the score is above the threshold, then at 1162, a verification test is presented. Embodiments can include presenting a verification test to the user prior to resuming the automated assistance session. In some embodiments, the verification test comprises presenting a topic verification question to the user. The selected topic for the verification test may, for example, be based on topics pertaining to a session stored in the topic list field 412 in data structure 400 (FIG. 4). In some embodiments, the verification test can be a location verification test. In embodiments, the verification test comprises presenting a location verification question to the user. For example, the question may be, "Are you from Chicago?"

At 1164, it is determined whether an affirmative answer is received. If yes, then the process proceeds to 1166 where the previous session is resumed. For example, if the user answers that the topic is correct, and/or that the location is correct and matches the topic or location in saved session context, then the likelihood of it being the disconnected caller is more probable.

At 1164, if it is determined that an affirmative answer is not received, then the process proceeds to 1160 where a new session is started. The return score formula disclosed herein is an example, and any suitable formula may be substituted.

As can now be appreciated, disclosed embodiments provide techniques for restoring an interrupted automated assistance session. Session contexts including pertinent metadata are periodically saved for each session, including a session reentry point. When a user calls an automated response system, metadata is collected from the user and compared with metadata from saved session contexts. If the user is determined to be associated with a saved session context, the user is connected to a conversation starting at the session reentry point, thereby eliminating the need to repeat the entirety of previously provided information. This can save considerable time for the caller, reducing frustration and improving the overall customer experience. This improves the technical fields of automated assistant system technology as well as customer service management system technology.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations.

In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for restoring an interrupted automated assistance session, comprising:
 saving a session context for the interrupted automated assistance session, wherein the session context includes an average voice frequency;
 determining that a user is associated with the saved session context, wherein the determining includes determining an average voice frequency for a caller, and comparing the average voice frequency of the caller to the average voice frequency of the saved session context; and
 identifying a session reentry point for the interrupted automated assistance session; and resuming the interrupted automated assistance session from the session reentry point.

2. The method of claim 1, wherein saving a session context includes saving a user telephone number associated with the interrupted automated assistance session.

3. The method of claim 1, wherein saving a session context includes saving an IP address associated with the interrupted automated assistance session.

4. The method of claim 1, wherein saving a session context includes saving a topic associated with the interrupted automated assistance session.

5. The method of claim 1, wherein saving a session context includes saving a user location associated with the interrupted automated assistance session.

6. The method of claim 1, wherein saving a session context includes saving user voice data associated with the interrupted automated assistance session.

7. The method of claim 1, wherein determining that the user is associated with the saved session context includes comparing a user telephone number with a saved telephone number stored in the saved session context.

8. The method of claim 1, wherein determining that the user is associated with the saved session context includes comparing a user IP address with a saved IP address stored in the saved session context.

9. The method of claim 1, further comprising, deleting the saved session context after a predetermined duration.

10. The method of claim 1, further comprising presenting a verification test to the user prior to resuming the automated assistance session.

11. The method of claim 10, wherein the verification test comprises presenting a topic verification question to the user.

12. The method of claim 10, wherein the verification test comprises presenting a location verification question to the user.

13. An electronic communication device comprising:
 a processor;
 a memory coupled to the processor, the memory containing instructions, that when executed by the processor, perform the steps of:
 saving a session context for an interrupted automated assistance session, wherein the session context includes an average voice frequency;
 determining that a user is associated with the saved session context, wherein the determining includes determining an average voice frequency for a caller, and comparing the average voice frequency of the caller to the average voice frequency of the saved session context;
 identifying a session reentry point for the interrupted automated assistance session; and
 resuming the interrupted automated assistance session from the session reentry point.

14. The electronic communication device of claim 13, wherein the memory further comprises instructions, that when executed by the processor, perform the step of saving a user telephone number associated with the interrupted automated assistance session.

15. The electronic communication device of claim 13, wherein the memory further comprises instructions, that when executed by the processor, perform the step of saving an IP address associated with the interrupted automated assistance session.

16. The electronic communication device of claim 13, wherein the memory further comprises instructions, that when executed by the processor, perform the step of saving a user location associated with the interrupted automated assistance session.

17. The electronic communication device of claim 13, wherein the memory further comprises instructions, that when executed by the processor, perform the step of presenting a verification test to the user prior to resuming the automated assistance session.

18. A computer program product for an electronic communication device comprising a computer readable storage medium having program instructions embodied therewith, the program instructions executable by a processor to cause the electronic communication device to perform the steps of:
 saving a session context for an interrupted automated assistance session, wherein the session context includes an average voice frequency;
 determining that a user is associated with the saved session context, wherein the determining includes determining an average voice frequency for a caller, and comparing the average voice frequency of the caller to the average voice frequency of the saved session context;
 identifying a session reentry point for the interrupted automated assistance session; and
 resuming the interrupted automated assistance session from the session reentry point.

19. The computer program product of claim 18, wherein the computer readable storage medium includes program instructions executable by the processor to cause the electronic communication device to perform the step of saving a topic associated with the interrupted automated assistance session.

20. The computer program product of claim 18, wherein the computer readable storage medium includes program instructions executable by the processor to cause the electronic communication device to perform the steps of:
 presenting a topic verification question to the user; and
 wherein resuming the automated assistance session from the session reentry point is performed in response to an affirmative response to the topic verification question.

* * * * *